United States Patent
Zeng et al.

(10) Patent No.: US 11,988,328 B2
(45) Date of Patent: May 21, 2024

(54) HAND-HELD SHOULDER-CARRYING DEVICE

(71) Applicant: TILTA INC., Burbank, CA (US)

(72) Inventors: Wenping Zeng, Burbank, CA (US); Kefeng Zhou, Burbank, CA (US)

(73) Assignee: TILTA INC., Burbank, CA (US)

( * ) Notice: Subject to any disclaimer, the term of this patent is extended or adjusted under 35 U.S.C. 154(b) by 10 days.

(21) Appl. No.: 17/873,755

(22) Filed: Jul. 26, 2022

(65) Prior Publication Data

US 2024/0035615 A1 Feb. 1, 2024

(51) Int. Cl.
*F16M 13/04* (2006.01)
*G03B 17/56* (2021.01)

(52) U.S. Cl.
CPC .......... *F16M 13/04* (2013.01); *G03B 17/561* (2013.01)

(58) Field of Classification Search
CPC ..... G03B 17/561; G03B 17/566; F16M 13/04
See application file for complete search history.

(56) References Cited

U.S. PATENT DOCUMENTS

| | | | | |
|---|---|---|---|---|
| 5,294,947 A * | 3/1994 | Harrington | ............ | F16M 13/00 396/420 |
| 7,665,698 B2 * | 2/2010 | Desorbo | ................ | F16M 13/02 396/419 |
| 7,703,995 B1 * | 4/2010 | Sivan | ................... | G03B 17/561 396/421 |
| 8,128,295 B2 * | 3/2012 | Pizzo | ................... | G03B 17/563 396/420 |
| 9,690,166 B1 * | 6/2017 | Sanders | ................. | F16M 13/04 |
| 10,178,295 B2 * | 1/2019 | Zeng | ...................... | F16M 11/18 |
| 2005/0201744 A1 * | 9/2005 | DeSorbo | ............... | F16M 13/04 396/419 |
| 2012/0328279 A1 * | 12/2012 | Raizman | ................ | F16M 13/04 396/421 |
| 2013/0108255 A1 * | 5/2013 | Vogt | ..................... | F16M 11/105 396/428 |
| 2015/0288858 A1 * | 10/2015 | Fee | ....................... | F16M 11/041 348/376 |
| 2020/0173755 A1 * | 6/2020 | Gonzales | ............... | F41C 23/16 |

* cited by examiner

*Primary Examiner* — Christopher E Mahoney
(74) *Attorney, Agent, or Firm* — Loza & Loza, LLP; Derek Yeung

(57) ABSTRACT

A hand-held shoulder-carrying device includes a handle assembly, a shoulder-carrying assembly, a back plate assembly, and a quick-mounting assembly, wherein the handle assembly and the back plate assembly are respectively provided at two ends of the shoulder-carrying assembly. An upper side of the shoulder-carrying assembly is provided with a camera mounting position for mounting a camera, and a lower side of the shoulder-carrying assembly is provided with a shoulder support position for fitting a shoulder of a user. The back plate assembly is provided with a back support position for fitting a back of the user, and the quick-mounting assembly is provided at an upper end of the shoulder-carrying assembly. The quick-mounting assembly is provided with a quick-mounting assembly base and a quick-mounting assembly bottom plate, wherein the quick-mounting assembly base is configured to enable quick mounting without changing the base in the process of switching shooting equipment.

12 Claims, 15 Drawing Sheets

HAND-HELD SHOULDER-CARRYING DEVICE

TECHNICAL FIELD

The present disclosure relates to the technical field of cameras, and in particular, to a handheld shoulder-carrying device.

BACKGROUND

In the field of photography, a photographer uses his shoulder as a support to use a camera. As a device to help the photographers use and control the camera for a long period of time, a shoulder-carrying device can help the photographer use and control the camera more conveniently and comfortably.

SUMMARY

To solve the above problems, the primary object of the present disclosure is to provide a hand-held shoulder-carrying device, which can improve the comfort when using and controlling the camera.

In order to achieve the above object, the technical schemes of the present disclosure are as follows.

A hand-held shoulder-carrying device includes a handle assembly, a shoulder-carrying assembly, a back plate assembly, and a quick-mounting assembly. The handle assembly and the back plate assembly are respectively provided at two ends (e.g., opposite ends) of the shoulder-carrying assembly, an upper side of the shoulder-carrying assembly is provided with a camera mounting position for mounting a camera, a lower side of the shoulder-carrying assembly is provided with a shoulder support position for fitting a shoulder of a user, the back plate assembly is provided with a back support position for fitting a back of the user, and the quick-mounting assembly is provided at an upper end of the shoulder-carrying assembly. In the device, after the camera is mounted on the camera mounting position, the user can fit the shoulder support position to a shoulder and fit the back support position to the back of the user, and the back support position and the shoulder support position jointly support the weight of the device and the camera mounted on the device, so that the user can grasp the handle assembly without much effort when the angle is not required to be adjusted. The device can improve the comfort of using and controlling the camera, making it easier for the user to use and control the camera.

In one aspect, the shoulder-carrying assembly includes a sliding plate and a shoulder frame, the sliding plate is provided on an upper side of the shoulder frame, the shoulder support position is provided on an lower side of the shoulder frame, the camera mounting position can be a slotted hole (e.g., obround, oval, waist-shaped hole, etc.) provided on the sliding plate, the sliding plate can be provided with a locking member for locking the camera on the sliding plate, and one end of the locking member is movably provided in the slotted hole in a back-and-forth (e.g., sliding) manner. The locking member may be a fastening screw, and the fastening screw is connected to the camera through the slotted hole to fix the camera on the sliding plate; in addition, the position of the camera when it is mounted on the sliding plate may be adjusted by controlling the back and forth (e.g. sliding) movement of the fastening screw in the space of the slotted hole, so as to adjust the center of gravity of the machine.

In one aspect, the sliding plate may be movably provided on the shoulder frame in a back-and-forth manner; that is, the sliding plate can move back and forth (e.g., sliding or linear direction) on the shoulder frame, which can further adjust the center of gravity the whole device and improve the comfort.

In one aspect, a shoulder rest is detachably provided at the lower side of the shoulder frame, and the shoulder support position is formed at a lower side of the shoulder rest. The arrangement of the detachable shoulder rest can facilitate the replacement of the shoulder rest which can fit the human body better when the device is in use.

In one aspect, the handle assembly includes a handle and a cross bar, the cross bar is rotatably and laterally provided at one end of the shoulder-carrying assembly, and the handle is connected to the cross bar. The angle of the handle may be adjusted by rotating the cross bar on the shoulder-carrying assembly.

In one aspect, the handle includes a left handle and a right handle, and the left handle and the right handle are rotatably and movably provided at opposite ends of the cross bar, respectively.

In one aspect, the handle assembly further includes a left telescopic arm and a right telescopic arm, one end of the left handle is rotatably and movably connected to one end of the left telescopic arm, and the other end of the left telescopic arm is rotatably and movably connected to one end of a cross bar; one end of the right handle is rotatably and movably connected to one end of the right telescopic arm, and the other end of the right telescopic arm is rotatably and movably connected to the other end of the cross bar. The arrangement of the left telescopic arm and the right telescopic arm, as well as the connection relationship between the left handle, the right handle, the left telescopic arm, the right telescopic arm and the cross bar, make the position and angle adjustment range of the left handle and the right handle of the device wider, and make the device more convenient to use.

In one aspect, the other end of the shoulder-carrying assembly is provided with a tail frame, the tail frame is provided with a sliding strip area, and the back plate assembly is movably provided in the sliding strip area in a back-and-forth (e.g., sliding) manner. The back plate assembly can move back and forth to adjust the position of the back plate assembly, so as to make the back support position better fit the back of the user.

In one aspect, the shoulder-carrying assembly includes a corner frame and a back plate, the corner frame is movably provided on the sliding strip area in a back-and-forth (e.g., sliding) manner, the back support position is located on the back plate, and the back plate is movably provided on the corner frame in an up-and-down manner. The back plate may move in front, back, up and down directions relative to the shoulder-carrying assembly, so that the back support position can better fit the back of the user.

In one aspect, the back plate is detachably provided with a back rest, and the back support position is located on the back rest. The arrangement of the detachable back rest can facilitate the replacement of the back rest which fits the human body better when the device is in use.

In one aspect, the back plate includes a main plate and a chute member, the chute member is rotatably provided on one side of the main plate, and the back rest is detachably provided on the other side of the main plate. The chute member can be rotated on the main plate to swing or pivot at a certain angle, so that the main plate or back rest can completely or substantially fit the back of the human body.

In one aspect, the quick-mounting assembly includes a quick-mounting assembly base and a quick-mounting assembly bottom plate, wherein the quick-mounting assembly base is provided with an Arca standard dovetail mounting area and a Manfrotto standard dovetail mounting area, and the mounting plate of the Arca standard dovetail groove and the mounting plate of the Manfrotto standard dovetail groove can be mounted at the same time, so that quick mounting can be realized without changing the base in the process of switching shooting equipment; and a front side of the quick-mounting bottom plate is provided with a mounting plate for mounting an Arca standard dovetail groove, and a back side of the quick-mounting bottom plate is provided with a mounting plate for mounting a Manfrotto standard dovetail groove.

The present disclosure has the beneficial effects that after the camera is mounted on the camera mounting position, the user can fit the shoulder support position to a shoulder and fit the back support position to the back, and the back support position and the shoulder support position jointly support the weight of the device and the camera mounted on the device, so that the user can grasp the handle assembly without effort when the angle is not required to be adjusted. The device can improve the comfort of using and controlling the camera, making it easier for the user to use and control the camera.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details.

Figure 1:
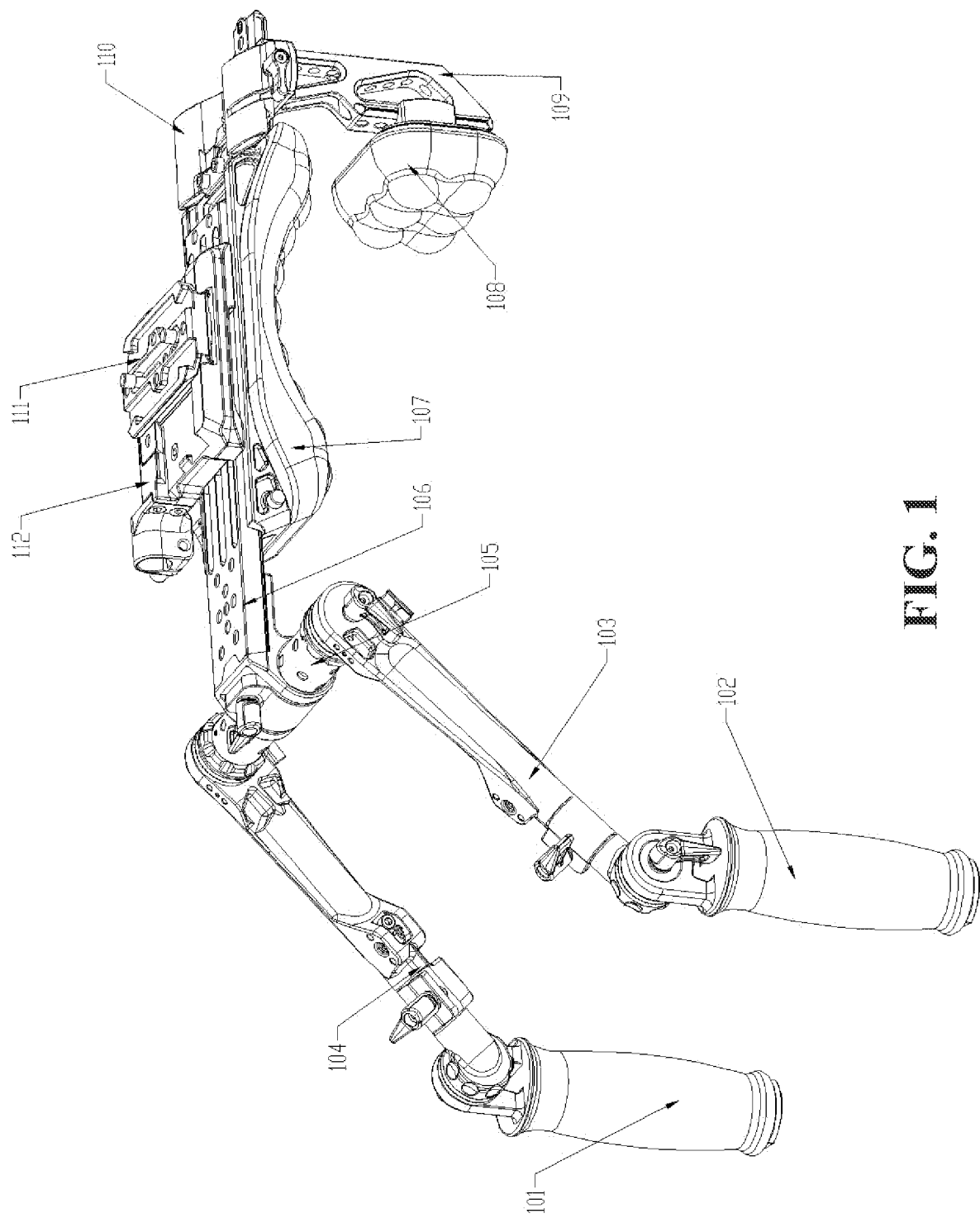
FIG. 1 is a schematic diagram of the present disclosure from a first perspective.
Figure 2:
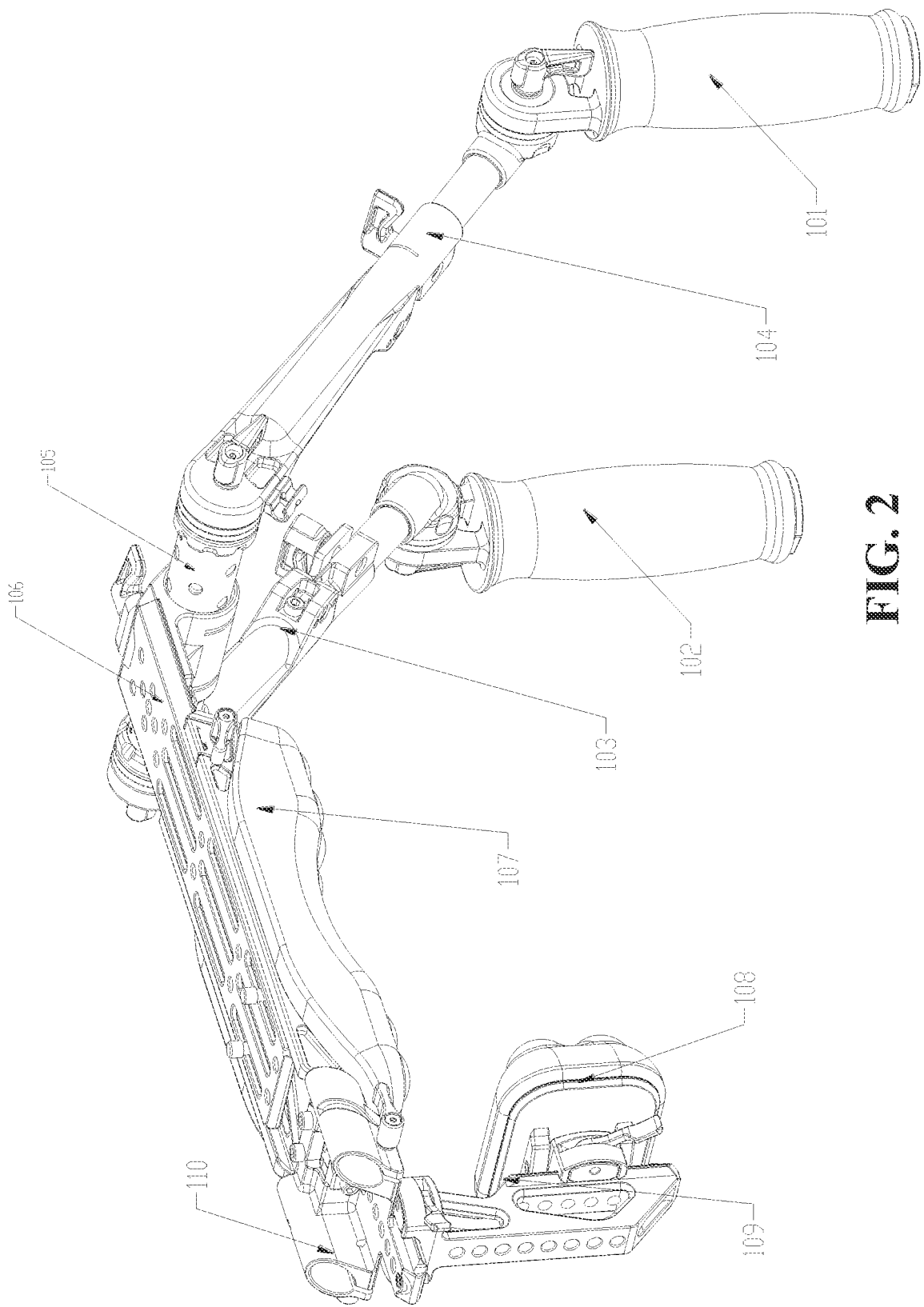
FIG. 2 is a schematic diagram of the present disclosure from a second perspective.
Figure 3:
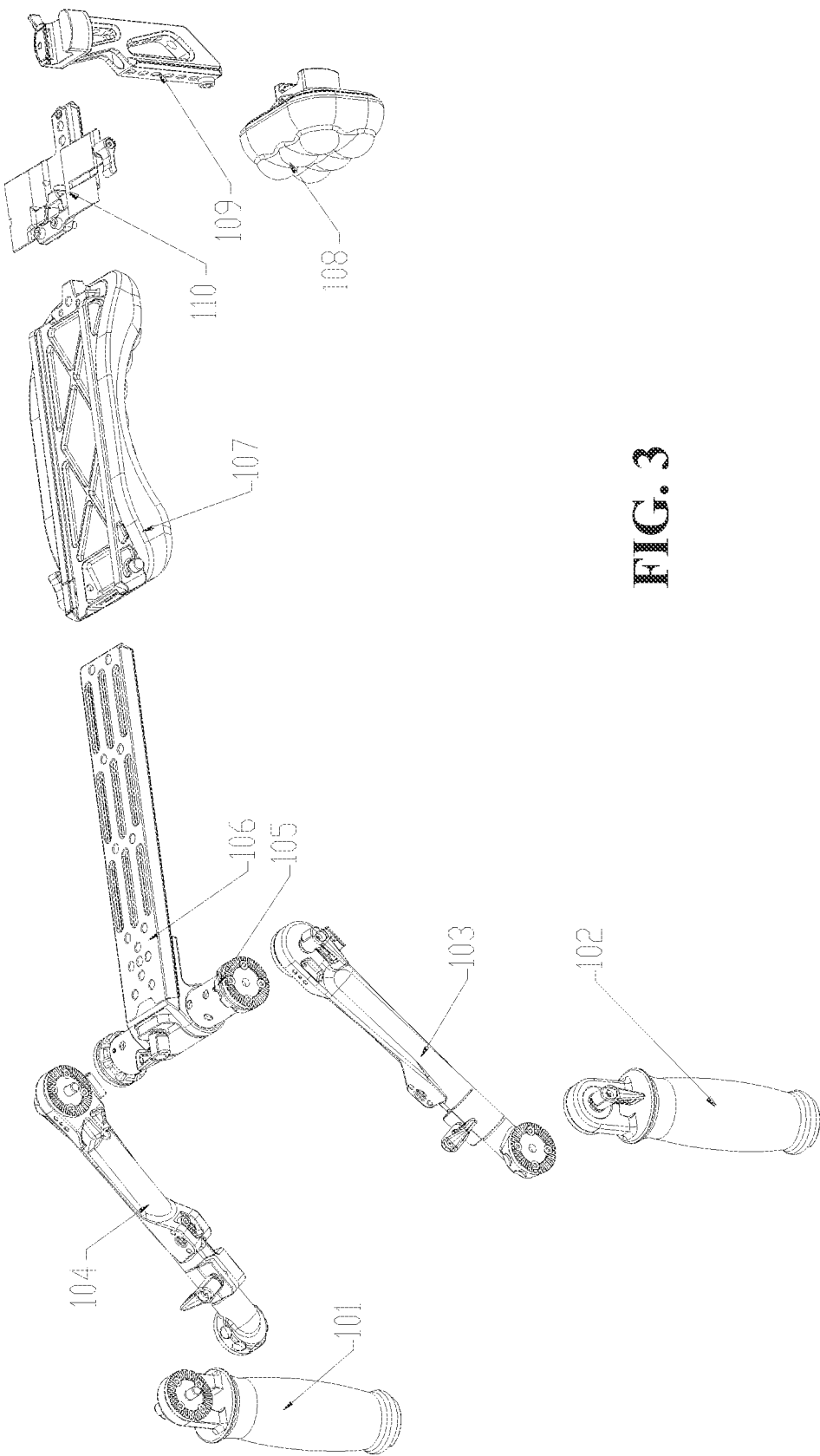
FIG. 3 is an exploded view of the present disclosure.

As shown in FIGS. 1-18, the present disclosure provides a hand-held shoulder-carrying device 1, which includes a right handle 101, a left handle 102, a left telescopic arm 103, a right telescopic arm 104, a cross bar 105, a sliding plate 106, a shoulder frame 107, a back plate 108, a corner frame 109, a tail frame 110, a quick-mounting bottom plate 111, and a quick-mounting base 112. The right handle 101 and the left handle 102 are provided on respective lateral sides of the shoulder frame 107. The cross bar 105 extends between the lateral sides of the shoulder frame 107. The "upper side" as used in this disclosure may correspond to the upper side of FIG. 1, and the "lower side" as used in this disclosure may correspond to the lower side of FIG. 1.

Figure 4:
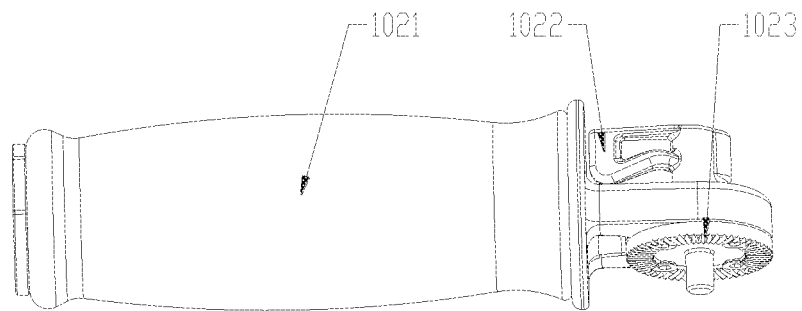
FIG. 4 is a schematic diagram of a handle of the present disclosure.

Referring to FIG. 4, the left handle 102 includes a grip end 1021, a crankset member 1023, and a hand screw 1022.

Figure 5:
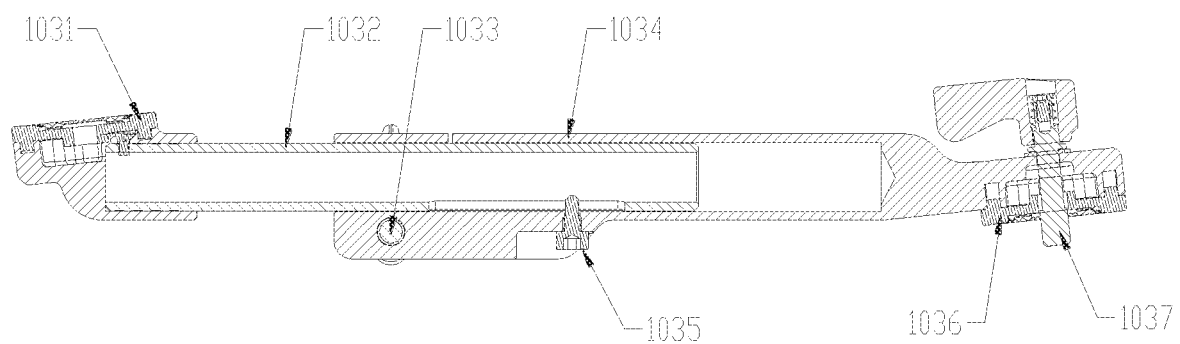
FIG. 5 is a sectional view of a telescopic arm of the present disclosure.

Referring to FIG. 5, the left telescopic arm 103 includes a crankset member 1031, a telescopic tube 1032, a hand screw 1033, a main body 1034, a limit screw 1035, a crankset member 1036 and a hand screw 1037. The telescopic tube 1032 is connected in the main body 1034, and can be telescopically adjusted in length. The crankset member 1031 is connected to the telescopic tube 1032. The telescopic tube 1032 is provided in the main body 1034, and the movable area is limited by the limit screw 1035, so that the telescopic tube 1032 may be axially telescopic and adjusted, and the telescopic tube 1032 can be fastened by a hand screw 1033. The crankset member 1036 is provided on the main body 1034, and the hand screw 1037 penetrates or traverses the crankset member 1036 and the main body 1034.

Further, the crankset member 1031 is connected to the left handle 102, and the crankset member 1036 is connected to the cross bar 105.

Further, the left handle 102 is connected to the left telescopic arm 103 through a crankset member 1023 and a crankset member 1031. The angle for use of the left handle 102 and the left telescopic arm 103 can be adjusted through the crankset member 1023 and the crankset member 1031.

Figure 6:
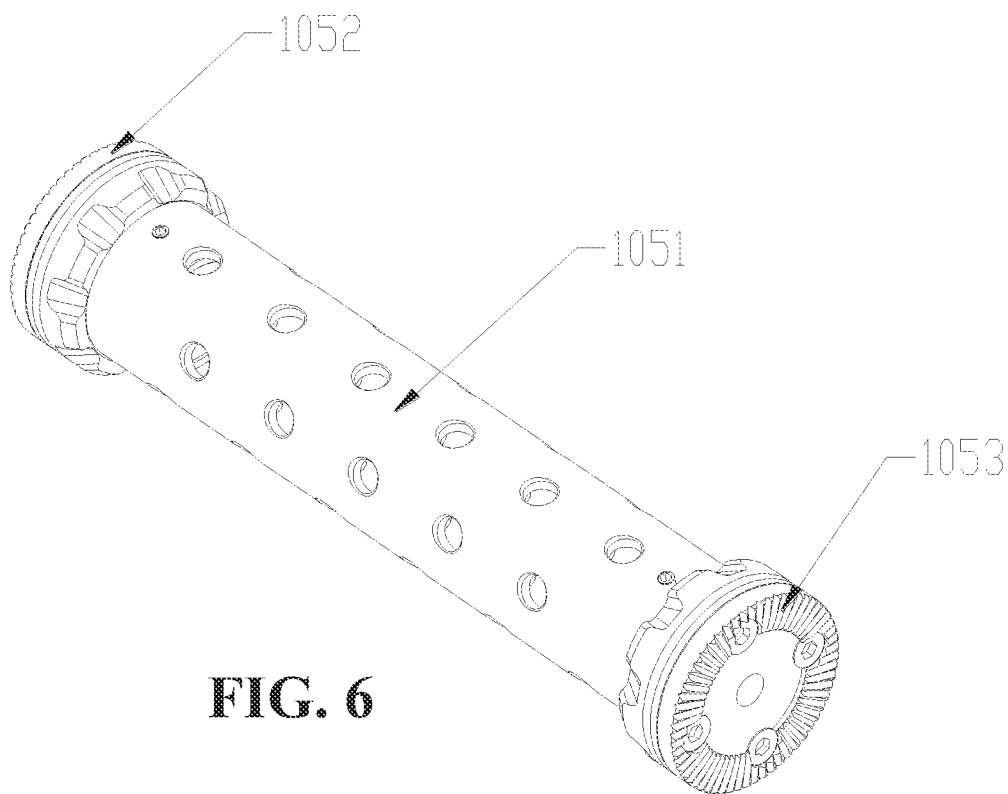
FIG. 6 is a schematic diagram of a cross bar of the present disclosure.

Referring to FIG. 6, the cross bar 105 includes a middle circular tube area 1051, a right crankset member 1052 and a left crankset member 1053. The left crankset member 1053 of the cross bar 105 can be connected to the crankset member 1023 of the left handle 102 or the crankset member 1036 of the left telescopic arm 103, and the mounting angle of the two crankset members may be correspondingly adjusted through the mutual engagement of crankset shapes.

The right handle 101 has the same structure as the left handle 102, the right telescopic arm 104 has the same structure as the left telescopic arm 103, and the connection relationship between the right handle 101 and the right telescopic arm 104 is the same as that between the left handle 102 and the left telescopic arm 103. The connection relationship between the right telescopic arm 104 and the cross bar 105 is the same as that between the left telescopic arm 103 and the cross bar 105.

Figure 7:
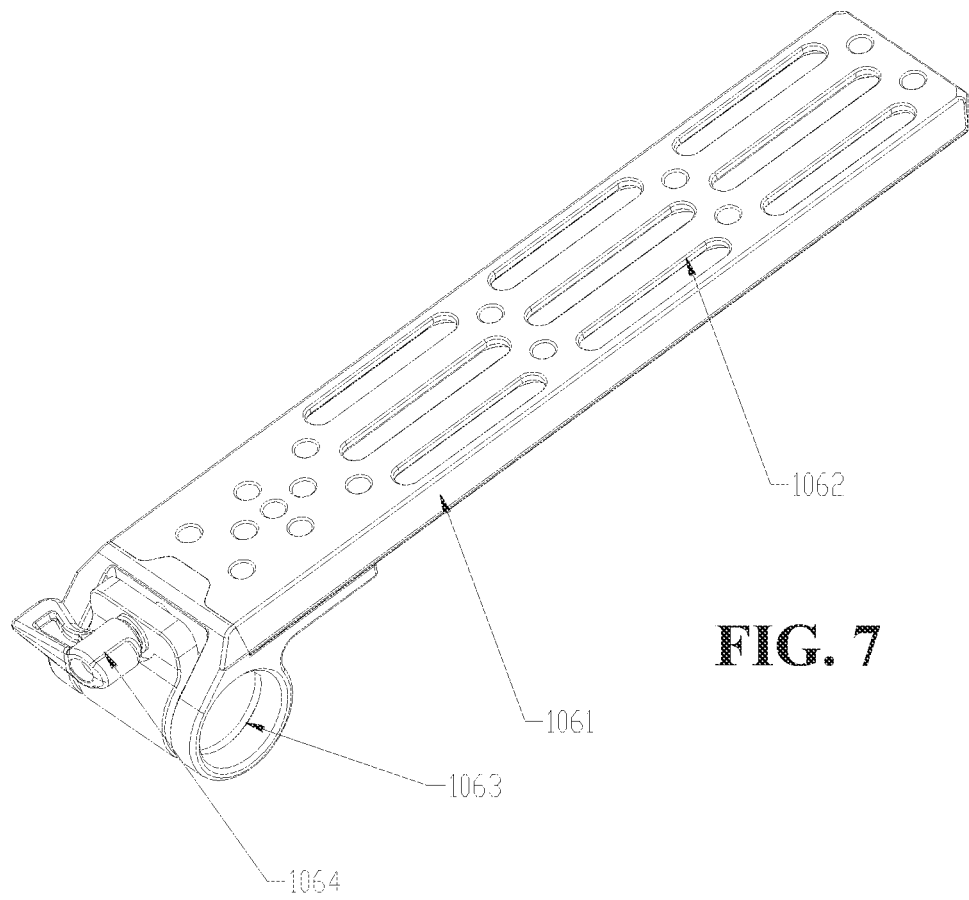
FIG. 7 is a schematic diagram of a sliding plate of the present disclosure.

Referring to FIG. 7, the sliding plate 106 includes a circular tube area 1063, a dovetail plate 1061, a slotted hole 1062, and a hand screw 1064. The circular tube area 1063 is connected to the cross bar 105, and the cross bar 105 can move axially and rotate normally relative to the circular tube area 1063 of the sliding plate for adjustment. The dovetail plate 1061 is provided with one or more slotted holes 1062, and the slotted holes 1062 provide various camera mounting positions for mounting a camera. One or more fastening screw (e.g., a locking member, a screw 113) can penetrate the slotted hole 1062 and is connected to the camera 2, the quick-mounting base 112 and the like, and moves back and forth through the space of the slotted hole 1062 to adjust the center of gravity of the machine.

Figure 8:
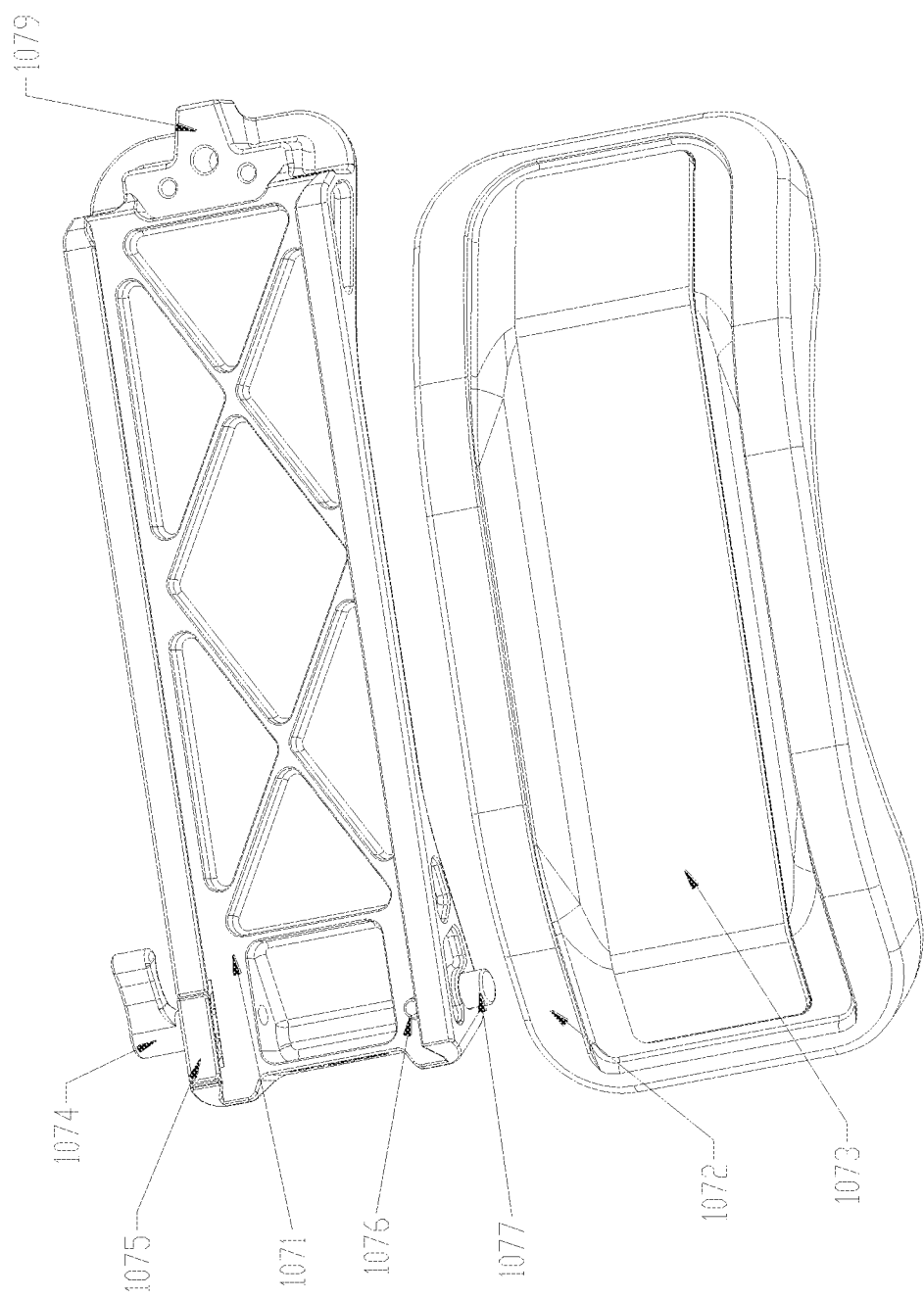
FIG. 8 is an exploded view of a shoulder frame of the present disclosure from a first perspective.
Figure 9:
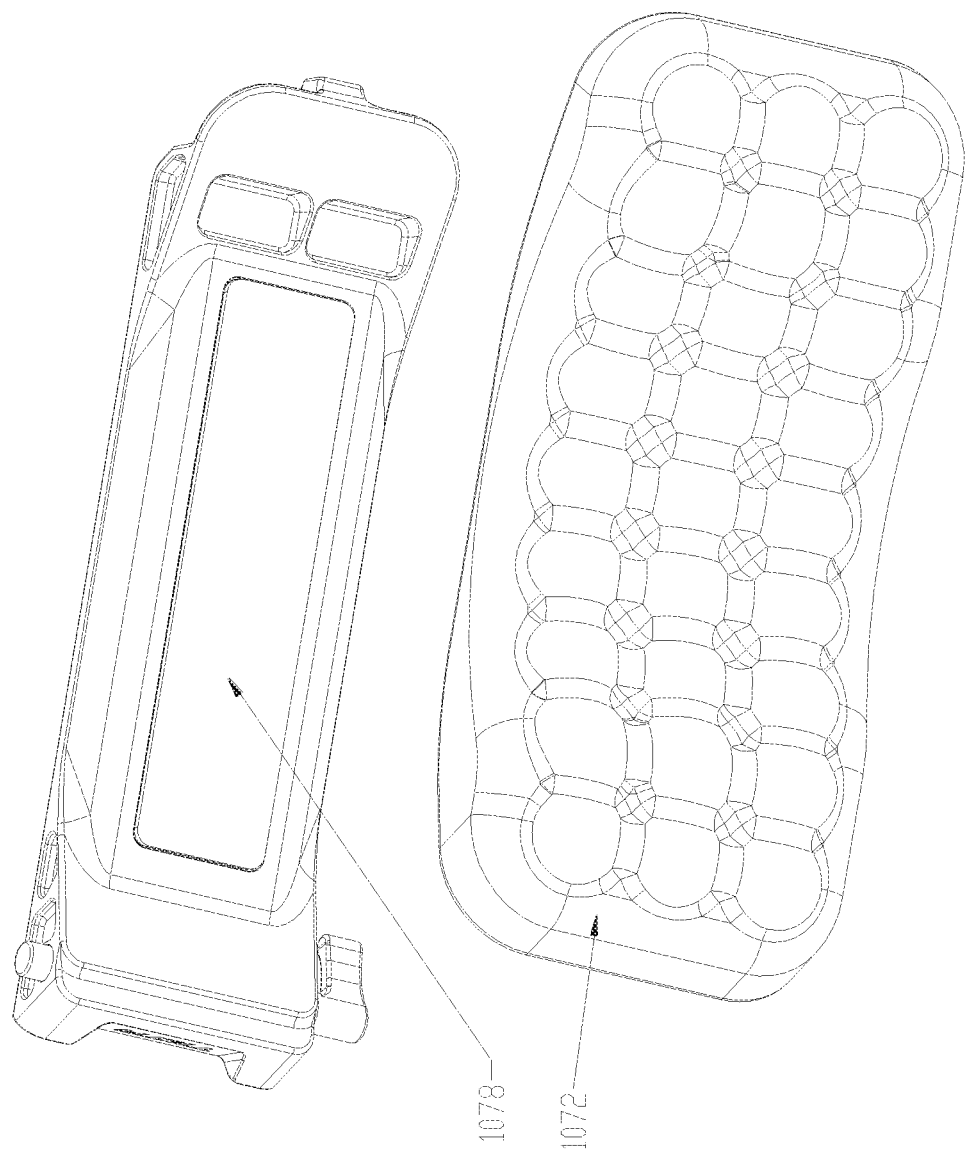
FIG. 9 is an exploded view of the shoulder frame of the present disclosure from a second perspective.
Figure 13:
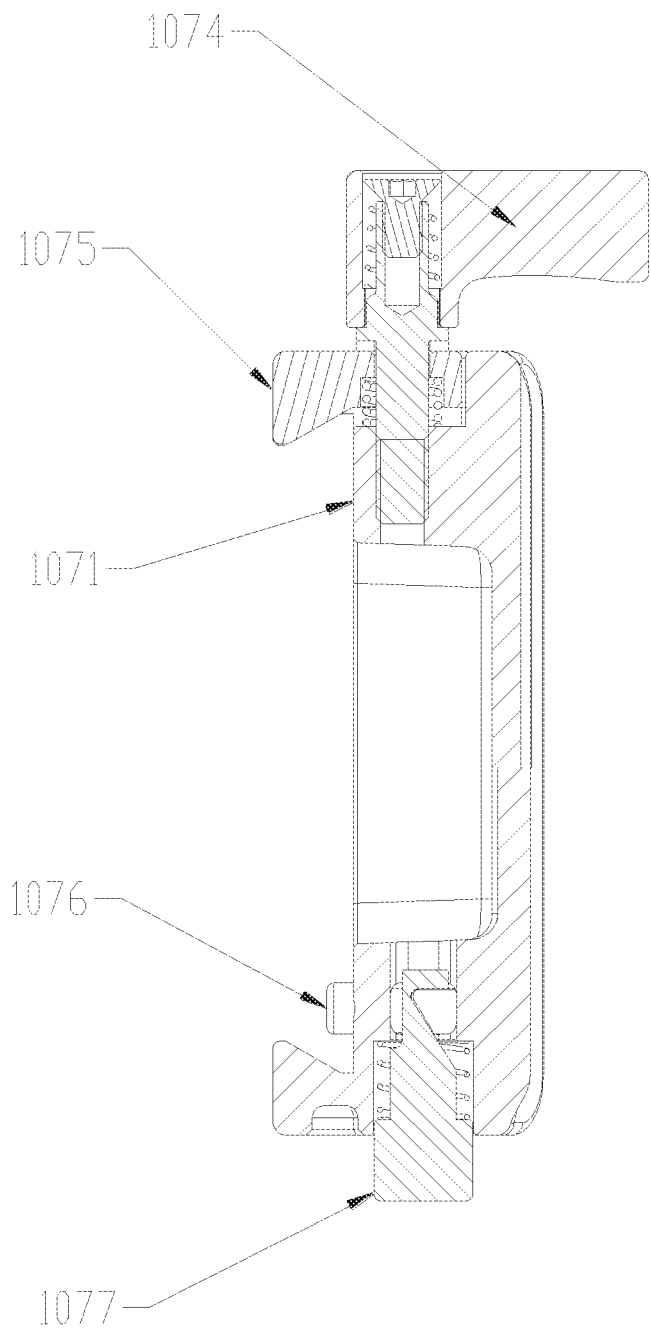
FIG. 13 is a sectional view of the shoulder frame of the present disclosure when the shoulder rest is hidden.

Referring to FIGS. 8, 9, and 13, the shoulder frame 107 includes a dovetail slot 1071, a shoulder rest 1072, a first hook and loop 1073, a hand screw 1074, a pressing block 1075, a safety pin 1076, a safety button 1077, a second hook and loop 1078, and a tail extension area 1079.

Further, the dovetail slot 1071 is provided in the middle of the shoulder frame 107, and serves as a connecting position of the dovetail plate 1061 of the sliding plate 106. The sliding plate 106 may move (e.g., slide) back and forth on the shoulder frame 107 to further adjust the center of gravity the whole device and improve the comfort of the user.

Further, the hand screw 1074 penetrates the pressing block 1075 and is connected to a groove of the dovetail slot 1071. When the hand screw 1074 is rotated, the hand screw 1074 drives the pressing block 1075 to move, so that the pressing block 1075 presses the sliding plate 106 when it is mounted on the groove of the dovetail slot 1071.

Further, the safety button 1077 and the safety pin 1076 are connected to the groove of the dovetail slot 1071. The safety pin 1076 prevents the sliding plate 106 from being disconnected from the shoulder frame 107 due to the accidental contact or operation of the hand screw 1074. The safety pin 1076 and the safety button 1077 can be connected by an inclined plane, and the base of the safety pin 1076 and/or the base of the safety button 1077 can be provided with a return spring. The safety pin 1076 and the safety button 1077 have a linkage relationship and movably connected to each other. Pressing the safety button 1077 can make the safety pin 1076 retract into the shoulder frame 107, and loosening the safety button 1077 can make the safety pin 1076 extend out of the shoulder frame 107, for example, under the action (e.g., decompression) of the return spring.

Further, the bottom of the shoulder frame 107 can be provided with a quick fastener (e.g., hook and loop fastener 1078), and the shoulder rest 1072 can be provided with a corresponding quick fastener (e.g., hook and loop fastener 1073), which can be quickly connected to the shoulder rest. The shoulder rest 1072 is provided with a shoulder support position for fitting the shoulder of the user when using the apparatus. The hook and loop 1073 and/or the hook and loop 1078 can be quickly disassembled or removed, which facilitates the replacement of a shoulder rest that fits the human body better.

Further, the tail extension area 1079 can be provided with a screw interface, which can be connected to the tail frame 110.

Figure 10:
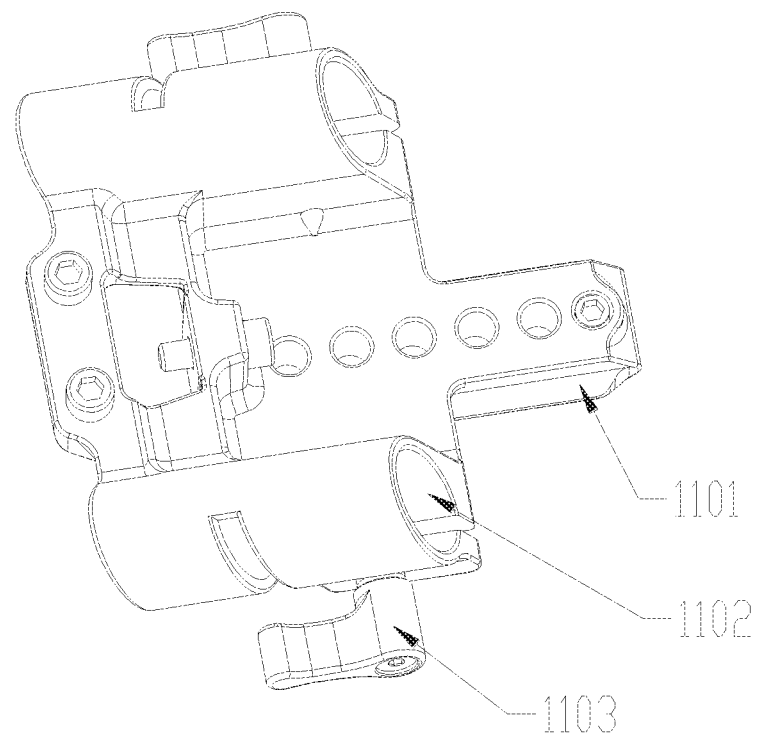
FIG. 10 is a schematic diagram of a tail frame of the present disclosure.

Referring to FIG. 10, the tail frame 110 includes a circular tube mounting area 1102, a hand screw 1103, and a sliding strip area 1101. The tail frame 110 is connected to the tail end extension area 1079 of the shoulder frame 107, the circular tube mounting area 1102 (e.g., a passage space) can be connected to (e.g., to receive therein) a circular tube as a connection interface of the photographic device. The sliding strip area 1101 (e.g., a beveled edge) serves as an interface for connecting with the corner frame 109, and the corner frame 109 can move back and forth in the sliding strip area 1101 (e.g., along the length direction of the sliding strip area 1101).

Figure 11:
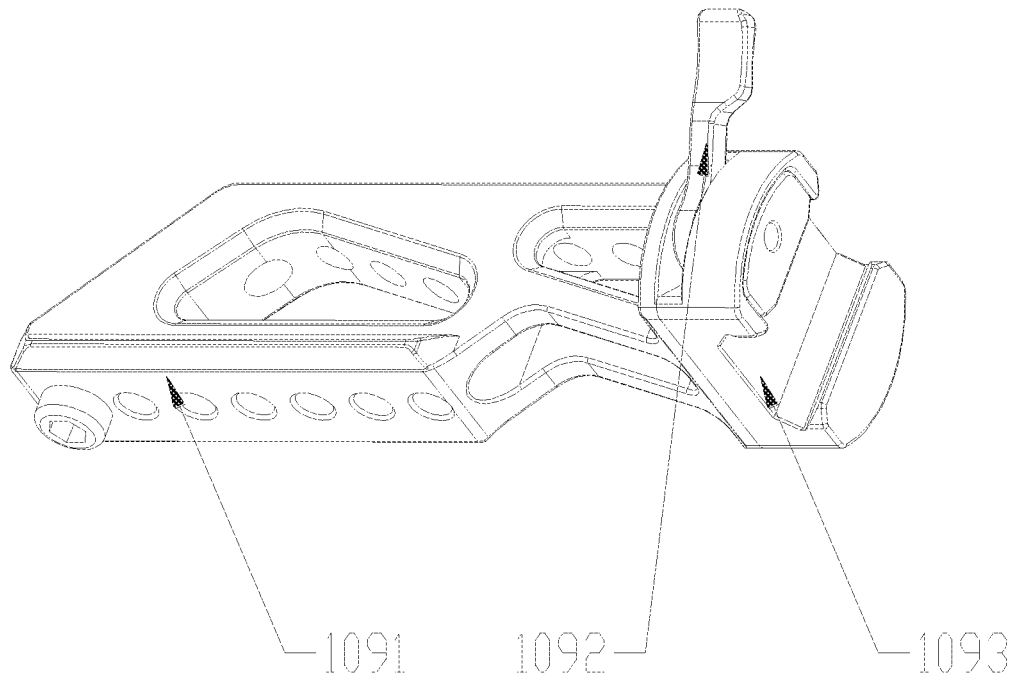
FIG. 11 is a schematic diagram of a corner frame of the present disclosure.

Referring to FIG. 11, the corner frame 109 includes a chute area 1093, a toggle wrench 1092 and a sliding strip area 1091. The chute area 1093 can be movably connected to the sliding strip area 1101 of the tail frame 110, and can be locked by operating the toggle wrench 1092. The sliding strip area 1091 of the corner frame 109 is at an angle (e.g., a right angle) with respect to the chute area 1903, and serves as the interface for connecting with the back plate 108. The back plate 108 can move up and down in the sliding strip area 1091 (e.g., sliding in the length direction of the sliding strip area 1091).

Figure 12:
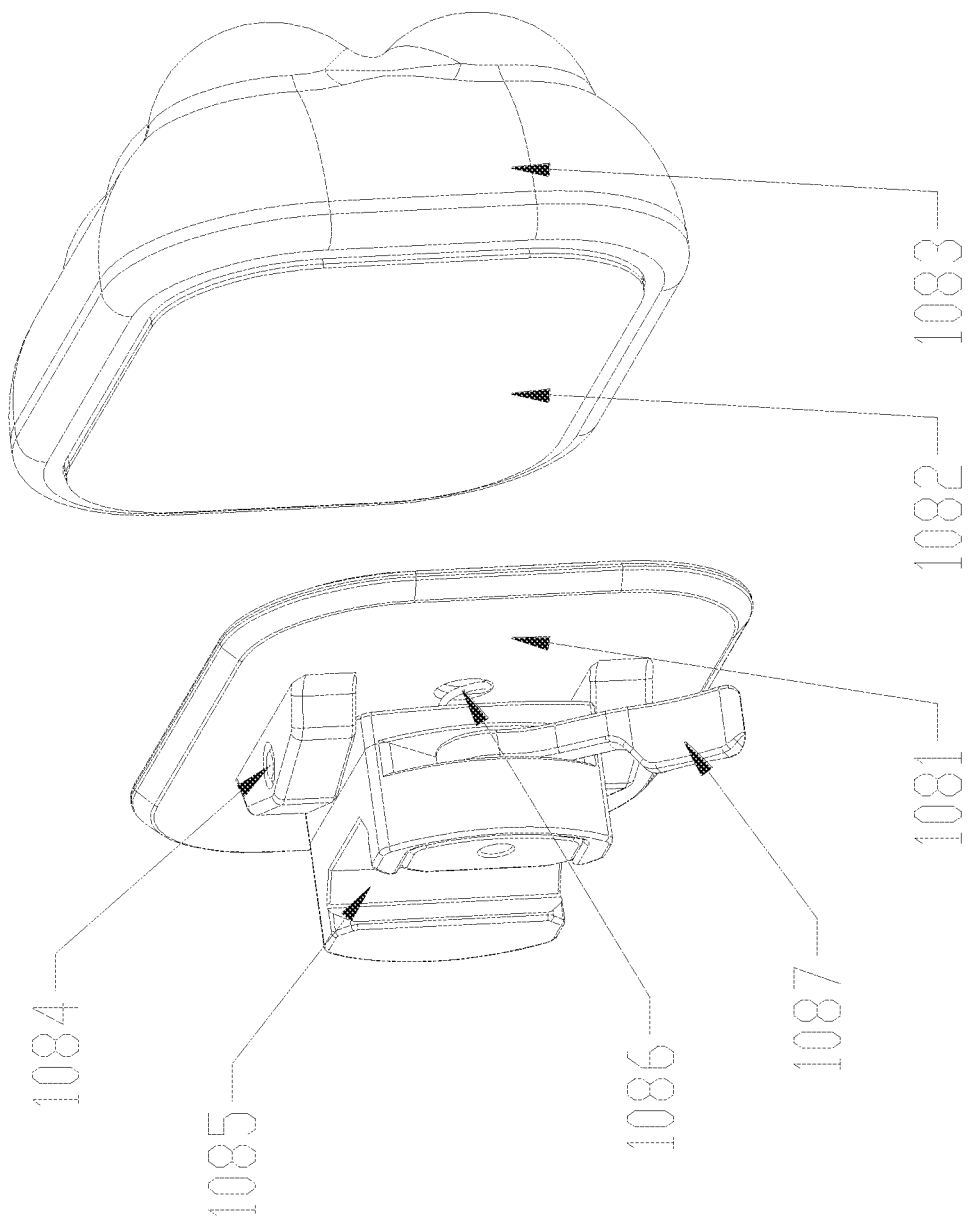
FIG. 12 is a schematic diagram of a back plate arm of the present disclosure.
Figure 14:
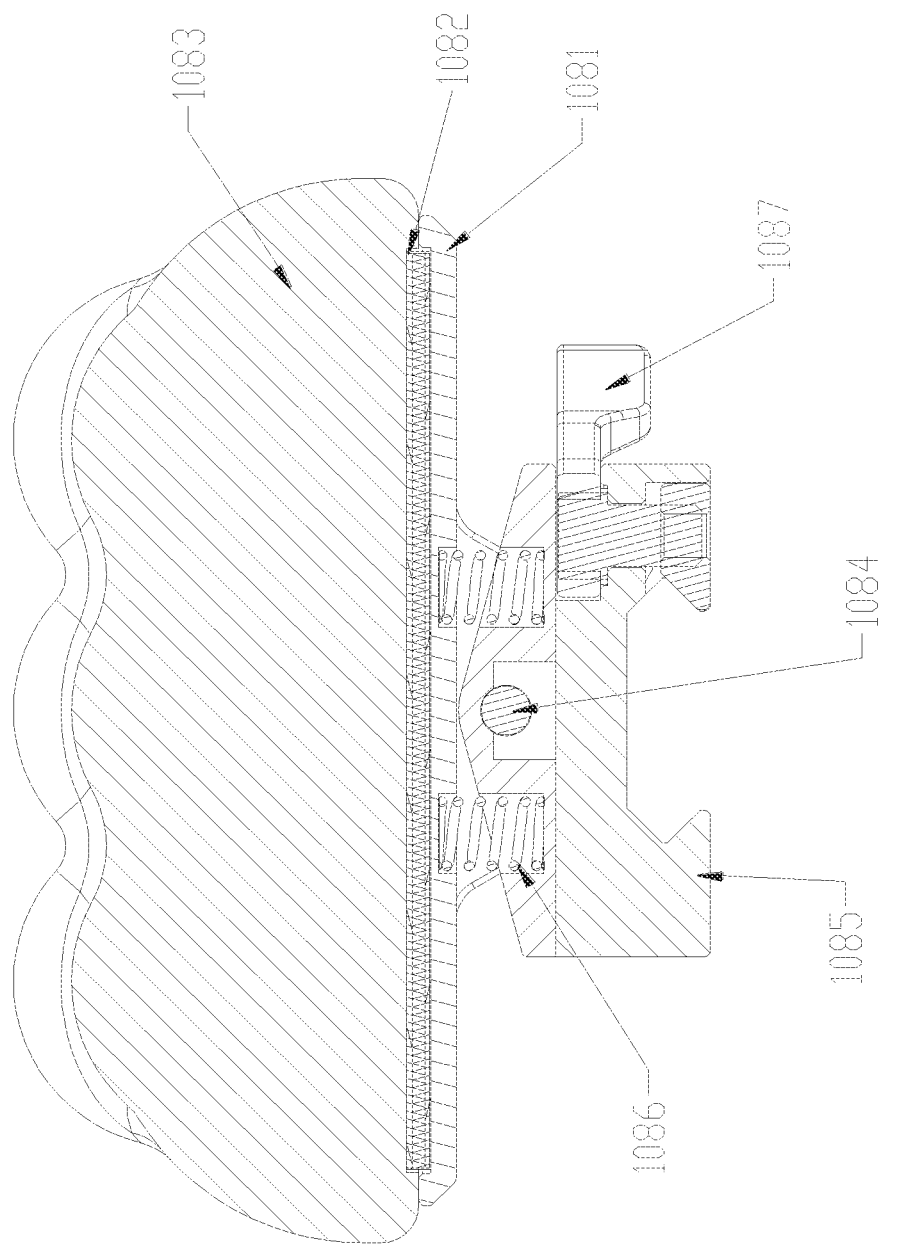
FIG. 14 is a sectional view of the back plate of the present disclosure.
Figure 15:
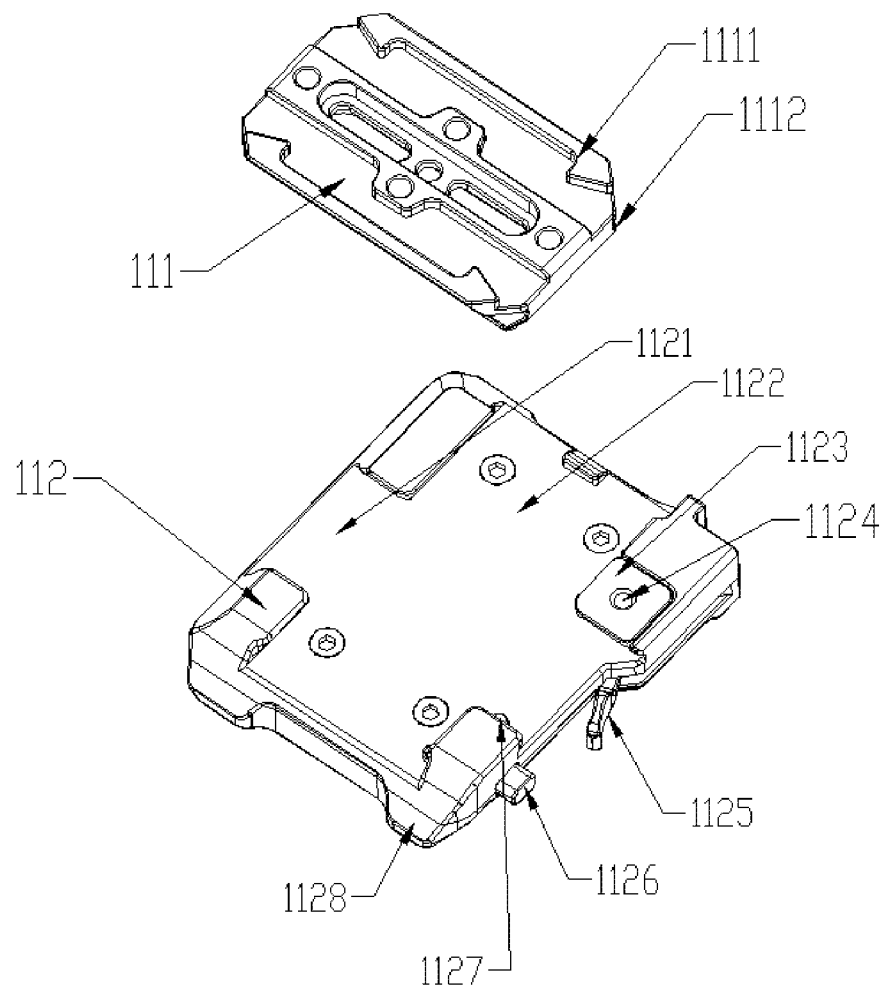
FIG. 15 is an exploded view of the device of the present disclosure and a camera.

Referring to FIGS. 12 and 14, the back plate 108 includes a main plate 1081, a chute member 1085, a toggle wrench 1087, a round pin 1084, and a return spring 1086. The chute member 1085 can be connected to the main plate 1081 through the round pin 1084, and a return spring 1086 is provided between the chute member 1085 and the main plate 1081. The chute member 1085 can swing (e.g., pivot, rotate, or swivel) at a certain angle relative to the main plate 1081 through the round pin 1084, so that the main plate 1081 can substantially or completely fit the back of the human body. The other side of the main plate 1081 can be provided with a fastener (e.g., hook and loop), which can quickly connect with the back rest 1082.

Further, the chute member 1085 of the back plate 108 can be connected to the sliding strip area 1091 of the corner frame 109, can move or slide up and down, and can be locked in position by operating the toggle wrench 1087 of the back plate 108.

The back rest 1082 can include a fastener (e.g., a hook and loop) and a flexible main body 1083, and the flexible main body 1083 is provided with a back support position for fitting the back of the user. The fastener (e.g., a hook and loop) on the back rest 1082 can be glued to the flexible main body 1083. For example, the back rest 1082 can be quickly connected to the back plate 108 through the fasteners (e.g., hook and loop). The back support position of the flexible shoulder rest is close to the back of the human body, thus providing cushioning and support, and improving the comfort of use.

Figure 16:
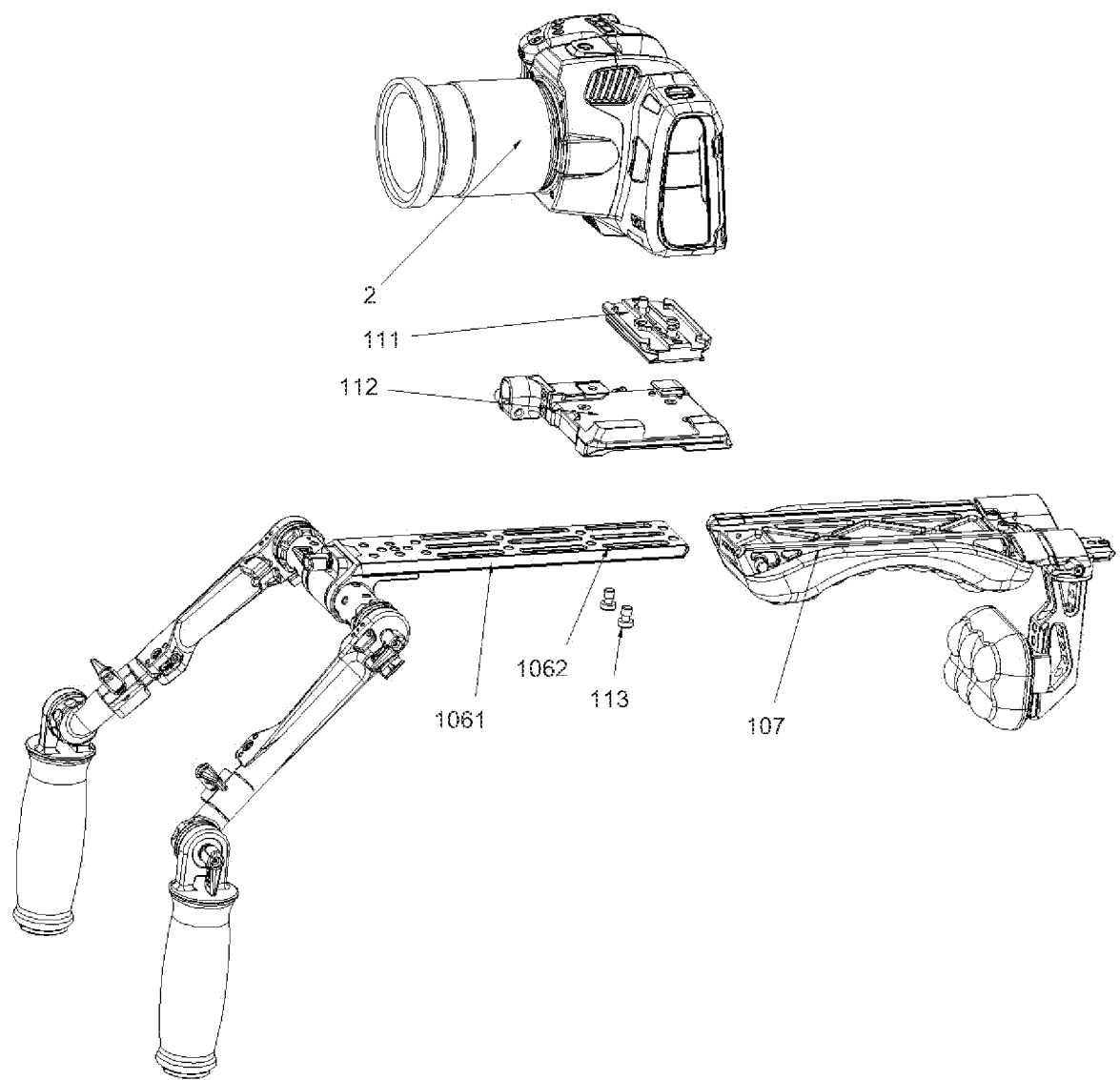
FIGS. 16 and 17 are schematic diagrams of the device of the present disclosure and a camera.

Referring to FIG. 16, the quick-mounting assembly includes a quick-mounting assembly base 112 and a quick-mounting assembly bottom plate 111. In one embodiment, the quick-mounting assembly base 112 includes an Arca standard dovetail mounting area 1121, a Manfrotto standard dovetail mounting area 1122, a base pressing member 1123, a base wrench 1124, a limit pin 1127, and a limit button 1126. The Arca standard dovetail mounting area 1121 and the Manfrotto standard dovetail mounting area 1122 are crossed (e.g., overlapped), and the mounting plate of the Arca standard dovetail groove and the mounting plate of the Manfrotto standard dovetail groove can be used for mounting at the same time. The front side of the quick-mounting bottom plate 111 is provided with a mounting plate 1111 configured with the Arca standard dovetail groove, and the back side is provided with a mounting plate 1112 configured with the Manfrotto standard dovetail groove.

Further, the quick-mounting base 112 further includes a limiting pin 1127 for limiting the movement of the quick-mounting plate 111. The limiting button 1126, the base pressing member 1123 for pressing the quick-mounting plate 111, and the base wrench 1124 are all fixedly mounted on the body or housing of the quick-mounting base 112.

In the present application, when using the Arca standard dovetail groove, the Arca standard dovetail mounting part 1112 on the front side of the quick-mounting plate 111 is mounted in the Arca standard dovetail mounting area 1121, and is pressed by the pressing member 1123 and limited by the limiting pin 1127. When the Manfrotto standard dovetail groove is used, the Manfrotto standard dovetail mounting part 1112 on the back side of quick-assembly plate 111 is mounted in the Manfrotto standard dovetail mounting area 1122, and is pressed by the pressing member 1123 and limited by the limiting pin 1127.

Figure 17:
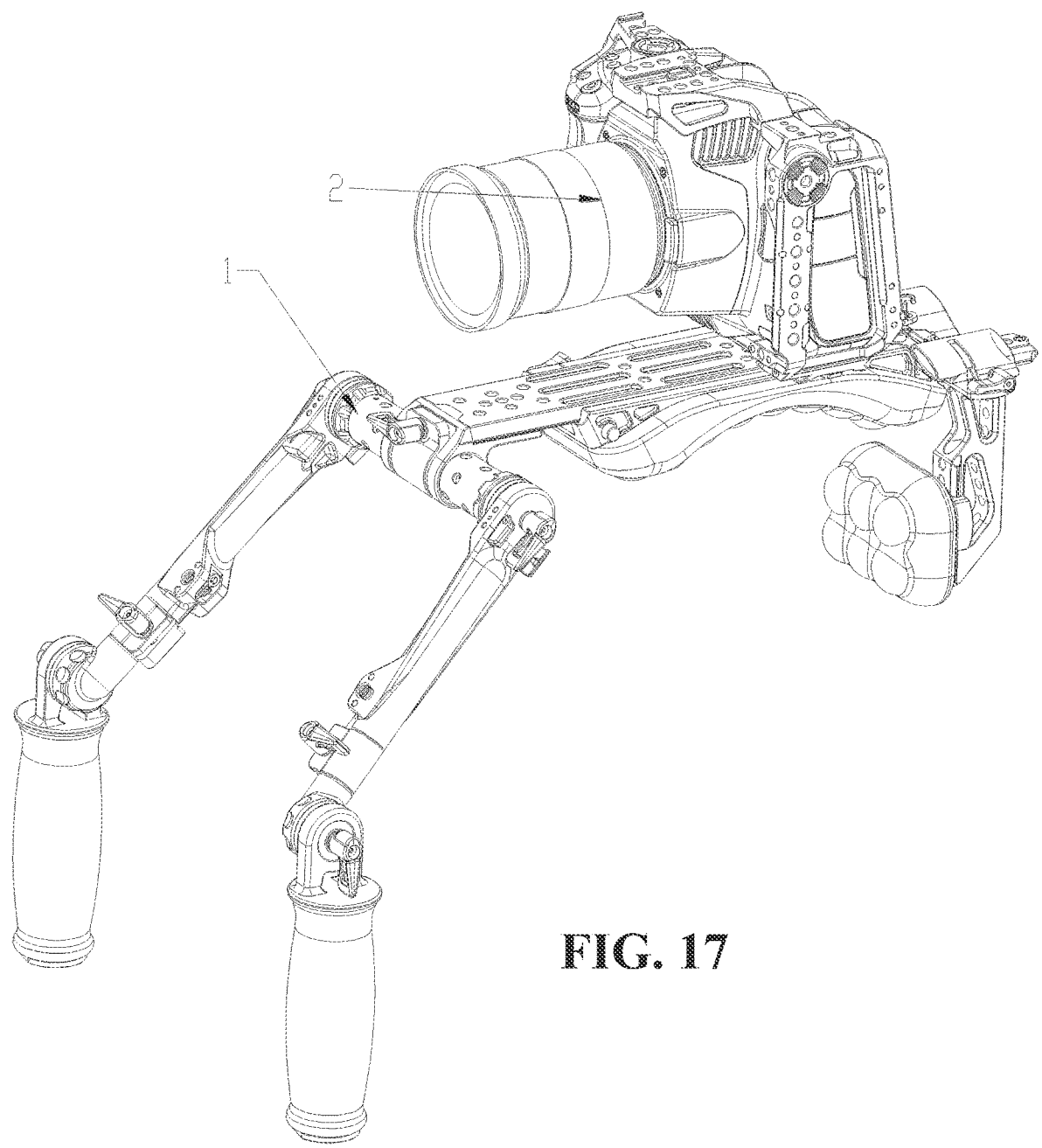

Referring to FIGS. 16 and 17, the mounting screw 113 penetrates the slotted hole 1062 of the sliding plate 106 and is connected to the quick-mounting base (e.g., quick-mounting assembly base 112). The quick-mounting bottom plate 111 is connected to the camera 2, and then the quick-mounting bottom plate 111 is mounted on the quick-mounting base 112. In one embodiment, the mounting screw 113 can be connected to the camera 2 through the slotted hole 1062 of the sliding plate 106.

Figure 18:
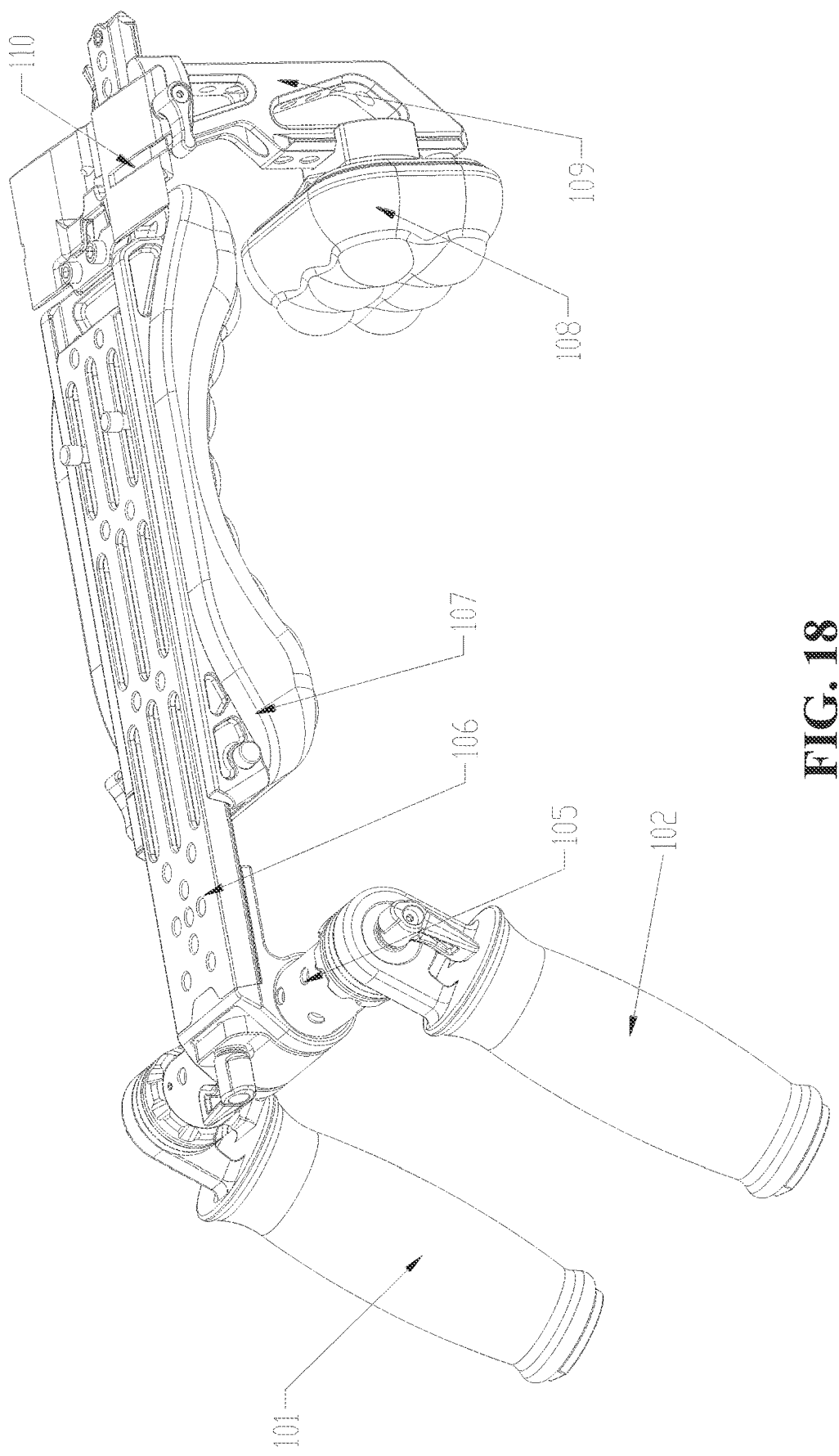
FIG. 18 is a schematic diagram of a second embodiment of the present disclosure without the left telescopic arm and the right telescopic arm.

Referring to FIG. 18, in another embodiment, the left telescopic arm and the right telescopic arm are not provided, and the left handle 102 is directly connected to the cross bar 105 through the crankset member 1023 and the crankset member 1053. The angle for use of the left handle 102 and the cross bar 105 can be adjusted through the crankset member 1023 and the crankset member 1053. The connection type between the right handle 101 and the cross bar 105 is the same as that between the left handle 102 and the cross bar 105, and is connected to the crankset member 1052 of the cross bar 105.

While the above description contains many specific implementations of the disclosure, these should not be construed as limitations on the scope of the disclosure, but rather as examples of specific implementations thereof. Accordingly, the scope of the disclosure should be determined not by the implementations illustrated, but by the appended claims and their equivalents.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A hand-held shoulder-carrying device, comprising:
    a handle assembly comprising a handle and a telescopic arm;
    a shoulder-carrying assembly, a first end of the handle being rotatably connected to a first end of the telescopic arm, and a second end of the telescopic arm being rotatably connected to a first end of the shoulder-carrying assembly;
    a back plate assembly; and
    a quick-mounting assembly,
    wherein the telescopic arm and the back plate assembly are respectively provided at a first end and a second end of the shoulder-carrying assembly, an upper side of the shoulder-carrying assembly is provided with a camera mounting position for mounting a camera, a lower side of the shoulder-carrying assembly is provided with a shoulder support position for fitting a shoulder of a user, the back plate assembly is provided with a back support position for fitting a back of the user, and the quick-mounting assembly is provided at an upper end of the shoulder-carrying assembly, and
    wherein the second end of the shoulder-carrying assembly is provided with a tail frame, the tail frame is provided with a sliding strip area, and the back plate assembly is movably provided in the sliding strip area in a sliding manner.

2. The hand-held shoulder-carrying device of claim 1, wherein the shoulder-carrying assembly comprises:
    a sliding plate and a shoulder frame, the sliding plate is provided on an upper side of the shoulder frame, the shoulder support position is provided on an lower side of the shoulder frame, the camera mounting position comprises at least one slotted hole provided on the sliding plate, the sliding plate comprises a locking member for locking the camera on the sliding plate, and one end of the locking member is movably provided in the at least one slotted hole and movable in a length direction of the at least one slotted hole.

3. The hand-held shoulder-carrying device of claim 2, further comprising:
    a shoulder rest detachably provided at the lower side of the shoulder frame, wherein the shoulder support position is at a lower side of the shoulder rest.

4. The hand-held shoulder-carrying device of claim 1, wherein the handle assembly comprises a cross bar that is rotatably and laterally provided at the first end of the shoulder-carrying assembly, and the telescopic arm is connected to the cross bar.

5. The hand-held shoulder-carrying device of claim 4, wherein the handle comprises a left handle and a right handle, and the left handle and the right handle are rotatably and movably provided at opposite ends of the cross bar, respectively.

6. The hand-held shoulder-carrying device of claim 5, wherein the telescopic arm further comprises:
 a left telescopic arm; and
 a right telescopic arm,
 a first end of the left handle being rotatably and movably connected to a first end of the left telescopic arm, and a second end of the left telescopic arm being rotatably connected to a first end of the cross bar;
 a first end of the right handle being rotatably and movably connected to a first end of the right telescopic arm, and a second end of the right telescopic arm being rotatably connected to a second end of the cross bar.

7. The hand-held shoulder-carrying device of claim 1, wherein the back plate assembly comprises a corner frame and a back plate, the corner frame is movably provided on the sliding strip area in a sliding manner, the back support position is located on the back plate, and the back plate is movably provided on the corner frame in a sliding manner.

8. The hand-held shoulder-carrying device of claim 7, wherein the back plate is detachably provided with a back rest, and the back support position is located on the back rest.

9. The hand-held shoulder-carrying device of claim 8, wherein the back plate comprises a main plate and a chute member, the chute member is rotatably provided on one side of the main plate, and the back rest is detachably provided on the other side of the main plate.

10. The hand-held shoulder-carrying device of claim 1, wherein the quick-mounting assembly comprises a quick-mounting base and a quick-mounting bottom plate for mounting a camera.

11. The hand-held shoulder-carrying device of claim 10, wherein the quick-mounting base comprises a body, and the body is provided with an Arca standard dovetail mounting area and a Manfrotto standard dovetail mounting area.

12. The hand-held shoulder-carrying device of claim 10, wherein a first side of the quick-mounting bottom plate is provided with a mounting plate for mounting an Arca standard dovetail groove, and a second side of the quick-mounting bottom plate is provided with a mounting plate for mounting a Manfrotto standard dovetail groove.

* * * * *